United States Patent
Hobohm et al.

(10) Patent No.: US 11,594,125 B2
(45) Date of Patent: Feb. 28, 2023

(54) SYSTEM AND METHOD FOR SUPPORTING THE PREDICTION OF A FUTURE SIGNALING OF A TRAFFIC INFRASTRUCTURE ELEMENT

(71) Applicant: YUNEX GMBH, Munich (DE)

(72) Inventors: Daniel Hobohm, Holzkirchen (DE); Felix Rudolph, Munich (DE)

(73) Assignee: YUNEX GMBH, Munich (DE)

( * ) Notice: Subject to any disclaimer, the term of this patent is extended or adjusted under 35 U.S.C. 154(b) by 288 days.

(21) Appl. No.: 16/956,685

(22) PCT Filed: Dec. 13, 2018

(86) PCT No.: PCT/EP2018/084674
§ 371 (c)(1),
(2) Date: Jun. 22, 2020

(87) PCT Pub. No.: WO2019/121283
PCT Pub. Date: Jun. 27, 2019

(65) Prior Publication Data
US 2020/0327803 A1   Oct. 15, 2020

(30) Foreign Application Priority Data
Dec. 21, 2017   (DE) .......................... 102017223579

(51) Int. Cl.
*G08G 1/01*   (2006.01)
*H04W 4/40*   (2018.01)
*G06N 20/00*   (2019.01)
*G06N 5/04*   (2023.01)
*G08G 1/0967*   (2006.01)

(52) U.S. Cl.
CPC ............. *G08G 1/0141* (2013.01); *G06N 5/04* (2013.01); *G06N 20/00* (2019.01); *G08G 1/0129* (2013.01); *G08G 1/096716* (2013.01); *G08G 1/096775* (2013.01); *H04W 4/40* (2018.02)

(58) Field of Classification Search
CPC .............. G08G 1/0141; G08G 1/0129; G08G 1/096716; G08G 1/096775; G08G 1/093; G06N 5/04; G06N 20/00; H04W 4/40
See application file for complete search history.

(56) References Cited

U.S. PATENT DOCUMENTS

| | | |
|---|---|---|
| 8,972,145 B2 | 3/2015 | Mahler et al. |
| 9,396,657 B1* | 7/2016 | Bauer .................. G08G 1/0129 |
| 2014/0277986 A1 | 9/2014 | Mahler et al. |
| 2016/0379126 A1 | 12/2016 | Ozatay et al. |
| 2017/0084172 A1 | 3/2017 | Rolle et al. |
| 2017/0146362 A1 | 5/2017 | Bai et al. |
| 2017/0243485 A1* | 8/2017 | Rubin ..................... H04W 4/12 |

* cited by examiner

Primary Examiner — Erika A Washington
(74) Attorney, Agent, or Firm — Laurence A. Greenberg; Werner H. Stemer; Ralph E. Locher

(57) ABSTRACT

A system supports a traffic participant while predicting a future signaling of a traffic infrastructure element. The system contains a storage device in which artificial intelligence is stored, wherein the artificial intelligence includes a predictive model for predicting a future signaling of the traffic infrastructure element, and a communication device for transmitting the artificial intelligence to a traffic participant via a communication network.

18 Claims, 1 Drawing Sheet

SYSTEM AND METHOD FOR SUPPORTING THE PREDICTION OF A FUTURE SIGNALING OF A TRAFFIC INFRASTRUCTURE ELEMENT

BACKGROUND OF THE INVENTION

Field of the Invention

The invention relates to a system and a method for supporting a prediction of a future signaling of a traffic infrastructure element and also a computer program.

The prediction of signal images of light signal systems is disclosed in literature under the expression "signal phase and timing".

By way of example, so-called algorithms of artificial intelligence may be used for such a prediction, said algorithms so to speak deriving a future probable switching procedure or a probable future signal image of the light signal system from a switching method of a light signal system as a function of detector data of traffic detectors and an internal programming procedure. This approach is used by way of example in the case of light signal systems that are controlled as a function of traffic since such light signal systems adapt their green times and red times to a prevailing traffic situation in a flexible manner.

The corresponding predicted signal images or switching times may be provided by way of example to road users. These road users may by way of example accordingly adapt their speed in order to still pass during a green phase without having to stop at the light signal system.

However, such information is provided to the road users in a non-specific manner. This means that a prediction is developed namely on the part of the light signal system.

However, it remains hitherto unanswered as to precisely how this information is sent for which motor vehicle in a pre-processed manner, in addition by way of example in a geo-referenced manner. This represents a challenge that goes far beyond the generation of information and so to speak requires a real-time-based, geo-referenced distribution of information. In other words, in this case, an instance somewhere must know which motor vehicle is located where within by way of example a country, by way of example Germany, and from which direction said vehicle is approaching which light signal system in order then to provide the interpreted information precisely to this motor vehicle.

It would be more efficient to allow the motor vehicle to decide itself how it should assess the information or the state, for example as a function of its own route or driving behavior. For this purpose however, it is necessary for the vehicle to be sent in a sense a basic knowledge base regarding the switching behavior of the light signal system, then in addition for this to be supplemented with so to speak real-time precise situation-dependent additional information with the result that the vehicle may then draw its own conclusions regarding the steps to be taken.

This is technically hitherto not achieved and also not trivial to implement.

SUMMARY OF THE INVENTION

The object of the invention is therefore seen as providing a concept for efficiently supporting a road user during a prediction of a future signaling of a traffic infrastructure element.

This object is achieved by means of the respective subject matter of the independent claims. Advantageous embodiments of the invention are the subject matter of respective dependent subclaims.

According to a first aspect, a system is provided for supporting a road user during a prediction of a future signaling of a traffic infrastructure element, comprising:

a storage facility in which an artificial intelligence is stored, wherein the artificial intelligence comprises a predictive model for predicting a future signaling of the traffic infrastructure element and a communications facility for transmitting the artificial intelligence to a road user via a communications network.

According to a second aspect, a method is provided for supporting a road user during a prediction of a future signaling of a traffic infrastructure element using an artificial intelligence, wherein the artificial intelligence comprises a predictive model for predicting a future signaling of the traffic infrastructure element, comprising:

transmitting the artificial intelligence to a road user via a communications network.

According to a third aspect, a computer program is provided, which comprises a program code for implementing the method for supporting a road user during a prediction of a future signaling of a traffic infrastructure element, if the computer program is executed on a computer, by way of example on the system for supporting a road user during a prediction of a future signaling of a traffic infrastructure element.

According to a fourth aspect, a script is provided to the road user, a motor vehicle for example, said script containing or comprising this artificial intelligence, with the result that the road user, the motor vehicle for example, then in the respective sub-second-precise situation ("real time") may derive in a prevailing and/or georeferenced manner how the traffic infrastructure element, a light signal system for example, is switched in the near future.

The invention is based on the knowledge that the above object may be achieved by virtue of the fact that the artificial intelligence, which comprises a predictive model for predicting a future signaling of the traffic infrastructure element, is transmitted to the road user/road users via a communications network.

Consequently, the road user/road users is or are put in a position in which they themselves predict the future signaling of the traffic infrastructure element using the artificial intelligence. In this case, the road user may take into account their own boundary conditions in an advantageous manner. By way of example, the road user may take into account from which direction said road user is approaching the light signal system or where the road user wishes to drive to or where the road user is located relative to the light signal system.

This means in other words that the concept in accordance with the invention focuses on providing the road user/road users via a communications network with artificial intelligence that comprises the predictive model that is used in order to predict the future signaling of the traffic infrastructure element.

As a consequence, for example the technical advantage is achieved that the road user may be supported efficiently during a prediction of a future signaling of a traffic infrastructure element.

According to one embodiment, the road user is a motor vehicle. The motor vehicle is embodied so as to travel by way of example in a highly automated manner, by way of example in a fully autonomous manner.

In accordance with one embodiment, the motor vehicle comprises a driver assist system that uses the artificial intelligence for the prediction of the future signaling of the traffic infrastructure element. The driver assist system controls by way of example a lateral control and/or longitudinal control of the motor vehicle based upon the prediction of the future signaling of the traffic infrastructure element.

In accordance with one embodiment, it is provided that the predictive model is embodied so as to predict the future signaling of the traffic infrastructure element based upon traffic data, wherein the communications facility is embodied so as to transmit the traffic data to the road user via the communications network.

As a consequence, for example the technical advantage is achieved that the future signaling of the traffic infrastructure element may be predicted efficiently.

That means in other words by way of example that the same traffic data is transmitted to the road user via the communications network, which the traffic infrastructure element itself uses for the dedicated procedure of determining the future signaling. In this case, an algorithm for example is stored in the traffic infrastructure element and said algorithm determines a future signaling using the traffic data, said signaling then being displayed by means of the traffic infrastructure element. Alternatively or in addition thereto, the information may be processed directly by the motor vehicle or an element that is connected to said motor vehicle, for example in applications of highly automated driving or even autonomous driving.

This means in other words that the same input data (here the traffic data) is available to the road user as to the traffic infrastructure element in order to predict the future signaling using the predictive model.

According to a further embodiment, it is provided that the predictive model is embodied so as to predict the future signaling of the traffic infrastructure element based upon signaling data that describes a prevailing signaling of the traffic infrastructure element, and/or based upon switching time data that describes a prevailing switching time of the traffic infrastructure element, wherein the communications facility is embodied so as to transmit the signaling data and/or the switching time data to the road user via the communications network.

As a consequence, for example the technical advantage is achieved that the future signaling may be predicted efficiently.

This means in other words in particular that in accordance with this embodiment, prevailing information, in the present case the signaling data or the switching time data, of the traffic infrastructure element is provided to the road user.

The signaling data or the switching time data is in this case in particular determined by means of the traffic infrastructure element itself. Switching time data comprises in particular the information regarding one or more points in time at which a change in the signaling has taken place or will take place.

The communications facility in accordance with one embodiment comprises a first communications interface for transmitting the artificial intelligence to the road user. The communications facility in accordance with one embodiment comprises a second communications interface for transmitting the signaling data and/or switching time data and/or traffic data to the road user. The second communications interface is for example provided in the traffic infrastructure element.

According to another embodiment, it is provided that the communications facility is embodied so as not to transmit the artificial intelligence to the road user until one or more predetermined conditions are met.

As a consequence, for example the technical advantage is achieved that the transmission of the artificial intelligence may be performed in an efficient manner. Consequently, it may be determined precisely under which conditions the artificial intelligence is to be transmitted to the road user.

According to another embodiment, it is provided that the one or more predetermined conditions are respectively an element selected from the following group of conditions: road user is located within a predetermined distance with respect to the traffic infrastructure element, receiving by means of the communications facility a request from the road user to transmit the artificial intelligence.

As a consequence, for example the technical advantage is achieved that it may be efficiently ensured that the artificial intelligence is only transmitted to road users who are located within a predetermined distance with respect to the traffic infrastructure element. This distance may relate to an immediate light signal system or also by way of example to an entire city or region.

In particular, the technical advantage is achieved that an available bandwidth of the communications network is used efficiently insofar as by way of example the artificial intelligence is only transmitted upon request.

One condition is for example that a prediction quality is below a predetermined minimum threshold value. Then, in other words when the predetermined minimum threshold value is not met, it is provided by way of example that the predictive model is retrained or taught and only then is transmitted to the road user.

One condition is for example that a prediction quality is greater or better and in this respect exceeds a predetermined maximum threshold value. Then, in other words when the predetermined maximum threshold value is exceeded, the artificial intelligence comprising the predictive model is transmitted to the road user. A continuous improvement is in particular possible since more data is continually available for the model training.

One condition is for example that a reprogramming or redesigning of the traffic infrastructure element, the light signal system for example, has taken place.

According to one embodiment, a computer facility is provided that is embodied so as to train an artificial intelligence template or rather the artificial intelligence that is stored in the storage facility both based upon the data that the traffic infrastructure element itself uses in order to determine a future signaling as well as based upon the signaling that is determined and signaled by means of the traffic infrastructure element itself, wherein the computer facility is embodied so as to store the trained artificial intelligence template as the artificial intelligence in the storage facility or rather to update the artificial intelligence that is stored in the storage facility based upon the training.

As a consequence, for example the technical advantage is achieved that the artificial intelligence may be created or updated efficiently.

According to one embodiment, it is provided that the road infrastructure element is an element selected from the following group of road infrastructure elements: light signal system, variable traffic sign, speed-limiting traffic sign.

As a consequence, for example the technical advantage is achieved that the future signaling may be determined efficiently for these traffic infrastructure elements.

If the traffic infrastructure element is a light signal system, the signaling is by way of example a signal image of the light signal system.

If by way of example the traffic infrastructure element is a variable traffic sign, the signaling is for example a specific traffic sign type.

If the traffic infrastructure element is a speed-limiting traffic sign, the signaling is for example a disclosure of a permissible maximum speed.

Traffic data in the sense of the description describes by way of example a traffic situation. Traffic data in the sense of the description comprises by way of example detector data, for example detector data of one or more detectors for detecting traffic. Such detectors are arranged by way of example on, above or in a road and count by way of example motor vehicles.

Traffic data in the sense of the description in other words comprises in particular all the data that the traffic infrastructure element obtains, a light signal system for example, in order based upon this data to determine a future signaling, a signal image for example, which is then also actually displayed by means of the traffic infrastructure element. By way of example, an algorithm that is stored in the traffic infrastructure element is used for the corresponding determining procedure.

Detector data is in particular not simply loop data from induction loops (detectors) that are embedded in a road, which detect motor vehicles but by way of example also pedestrian scanners and arrival information of buses and trains, so-called public transportation telegrams.

An artificial intelligence in the sense of the description comprises by way of example procedures or rather methods from computer science, which by way of example render possible the automation of intelligent behavior. The procedures of the artificial intelligence are characterized inter alia by virtue of the fact that using mathematical means they enable the ability to learn and the ability to handle uncertainty and probabilistic information. Inter alia, by way of example, the following procedures are attributed to artificial intelligence: machine learning, deep learning, neural networks, knowledge acquisition, knowledge representation, cognition models, heuristic search, language processing. There are also a plurality of AI (artificial intelligence) programming languages and so-called frameworks available for the various procedures of artificial intelligence, which render it possible for the user to use so-called software libraries and to execute these by way of example also on cloud-based computing centers. Inter alia, these are by way of example IBM Watson, Amazon AWS, Google TensorFlow and Microsoft Azure.

According to one embodiment, it is provided that the system is embodied or configured so as to support a road user during a prediction of a future signaling of a traffic infrastructure element, to execute or to implement the method for supporting a road user during a prediction of a future signaling of a traffic infrastructure element.

In accordance with one embodiment, it is provided that the method for supporting a road user during a prediction of a future signaling of a traffic infrastructure element is executed or implemented by means of the system for supporting a road user during a prediction of a future signaling of a traffic infrastructure element.

Technical functionalities of the system result analogously from corresponding technical functionalities of the method and vice versa.

This means in other words in particular that corresponding system features result analogously from corresponding method features and vice versa.

Embodiments that are made in the context of the system apply analogously to the method and vice versa.

According to one embodiment, the system comprises the traffic infrastructure element.

According to one embodiment, the system does not comprise the traffic infrastructure element.

According to one embodiment, the communications network comprises a mobile network and/or a WLAN communications network.

If the road user is in the singular, the plural is always to be understood and vice versa.

According to one embodiment, it is provided that the predictive model is embodied so as to predict the future signaling of the traffic infrastructure element based upon traffic data, wherein the traffic data is transmitted to the road user via the communications network.

In accordance with a further embodiment, it is provided that the predictive model is embodied so as to predict the future signaling of the traffic infrastructure element based upon signaling data that describes a prevailing signaling of the traffic infrastructure element and/or based upon switching time data that describes a prevailing switching time of the traffic infrastructure element, wherein the signaling data and/or the switching time data is transmitted to the road user via the communications network.

In accordance with another embodiment, it is provided that the artificial intelligence is not transmitted to the road user until one or more predetermined conditions are met.

In accordance with a further embodiment, it is provided that an artificial intelligence template or rather the artificial intelligence is trained both based upon the data that the traffic infrastructure element itself uses in order to determine a future signaling as well as based upon the signaling that is determined and signaled by means of the traffic infrastructure element itself, wherein the trained artificial intelligence template is used as the artificial intelligence or rather the artificial intelligence is updated based upon the training.

The wording "or rather" includes in particular the wording "and/or".

The above-described characteristics, features and advantages of this invention and also the manner in which this is achieved become clearer and more easily understandable in connection with the following description of the exemplary embodiments that are further explained in connection with the drawings.

DETAILED DESCRIPTION OF THE INVENTION

Figure 1:
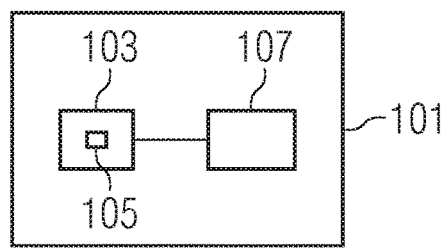
FIG. 1 shows a first system for supporting a road user during a prediction of a future signaling of a traffic infrastructure element.

FIG. 1 illustrates a system 101 for supporting a road user during a prediction of a future signaling of a traffic infrastructure element, comprising:

a storage facility 103 in which an artificial intelligence 105 is stored, wherein the artificial intelligence 105 comprises a predictive model for predicting a future signaling of the traffic infrastructure element, and a communications facility 107 for transmitting the artificial intelligence 105 to a road user via a communications network.

Figure 2:
FIG. 2 shows a flow diagram of a method for supporting a road user during a prediction of a future signaling of a traffic infrastructure element and FIG. 3 shows a second system for supporting a road user during a prediction of a future signaling of a traffic infrastructure element.

FIG. 2 illustrates a flow diagram of a method for supporting a road user during a prediction of a future signaling of a traffic infrastructure element using an artificial intelligence, wherein the artificial intelligence comprises a predictive model for predicting a future signaling of the traffic infrastructure element, comprising transmitting 201 the artificial intelligence to a road user via a communications network.

Figure 3:
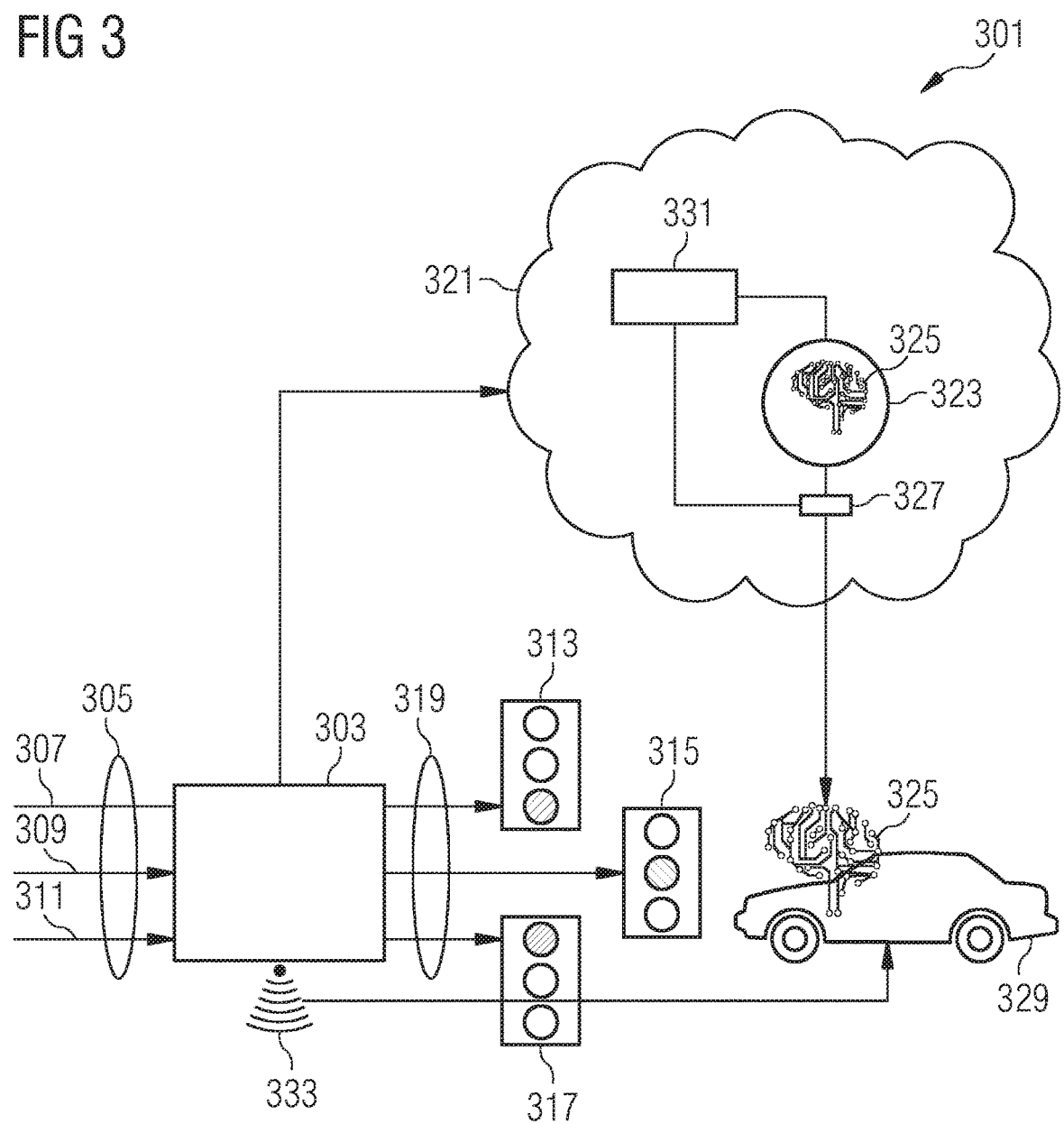

FIG. 3 illustrates a second system 301 for supporting a road user during a prediction of a future signaling of a traffic infrastructure element.

The traffic infrastructure element is a light signal system 303.

The light signal system 303 is provided with traffic data 305. The traffic data 305 comprises detector data from three detectors, which is represented symbolically by three arrows with the reference characters 307, 309 and 311. Detector data is in particular not simply loop data from induction loops that are embedded in a road and detect motor vehicles but by way of example also pedestrian scanners and also arrival information of buses and trains, so-called public transportation telegrams.

Based upon the traffic data 305, a control device (not shown) of the light signal system 303 determines respectively a signal image for three signal groups 313, 315 and 317. For this purpose, the control device by way of example uses an algorithm.

The signal image data that corresponds to these signal images is characterized symbolically as an ellipsis with the reference character 319.

The system 301 comprises a storage facility 323 in which an artificial intelligence 325 is stored.

Moreover, the system 301 comprises a computing unit 331.

The computer facility 331 and the storage facility 323 are part of a cloud infrastructure 321.

The traffic data 305 and the signal image data 319 are transmitted to the computer facility 331 and in particular are stored in the cloud infrastructure 321, in the storage facility 323 for example.

The computer facility 331 trains the artificial intelligence 325 using the traffic data 305 and also the signal image data 319. The artificial intelligence in this case performs better when it detects various switching behavior and detector data of the light signal system 303 over an ever-increasing period of time, thus in other words is usually trained using data over multiple months. In this case, in other words, it is provided that an output of the light signal system 303, in other words the determined signal images, are likewise provided to the computer facility 331 in addition to the traffic data 305 in order to train the artificial intelligence 325, with the result that this artificial intelligence may learn the behavior of the light signal system 303 in order to be able to predict the future signal image from this behavior.

The trained artificial intelligence 325 then comprises in this respect a predictive model for predicting a future signaling of the light signal system 303.

The system 301 comprises a first wireless communications interface 327 for transmitting the trained artificial intelligence 325 comprising the predictive model to a road user 329, a motor vehicle for example, via a wireless communications network.

Moreover, the system 301 comprises a second wireless communications interface 333, that is provided by the light signal system 303. This second communications interface 333 transmits prevailing light signal system information, by way of example switching times and/or detector data 305 and/or signal image data 319, to the road user 329 via the same wireless communications network and/or via another wireless communications network, via a WLAN communications network and/or via a mobile network for example.

The first and the second communications interface 327, 333 form a communications facility of the system 301.

Consequently, the road user 329 is advantageously put in a position in which they themselves predict a future signaling of the light signal system 303 using the artificial intelligence 325 and also the light signal system information. In this case, the further road user 329 by way of example may take into account their current location or their current direction of travel. The road user 329 may consequently interpret the results independently.

In one embodiment, it is provided that in addition to or instead of being trained in the cloud infrastructure 321, the artificial intelligence 325 is trained in or on a controller. The controller is the control device of the light signal system and is located in particular on the intersection at which the light signal system is arranged. This means in particular that it is not necessary for the procedure of training the model to inevitably take place in the cloud infrastructure 321 but rather may also take place locally on or in the control device. For this purpose, for example a hardware expansion may be provided in the controller in the form of one or more additional CPUs.

In accordance with one embodiment, it is provided that the trained artificial intelligence 325 is transferred or transmitted to the road user, by way of example to the road user 329, in a trigger-based manner via the communications network.

"Trigger-based" in this case means in particular that the artificial intelligence 325 is not transmitted to the road user/road users until one or more predetermined conditions are met, as already explained above.

A communications network in the sense of the description comprises by way of example a DSRC communications network. DSRC stands for "dedicated short range communication" and comprises a WLAN communications network for example.

In one embodiment, it is provided that the prevailing light signal system information is transmitted in parallel with the transmission of the artificial intelligence 325 to the road user/road users.

In accordance with one embodiment, it is provided that the prevailing light signal system information is transmitted in a non-discriminatory manner to the road user/road users. "In a non-discriminatory manner" in this case means in particular that each road user receives the information equally without any priority being granted to specific road users.

In accordance with one embodiment, it is provided that the computer facility 331 updates the artificial intelligence 325, by way of example updates the artificial intelligence periodically.

In summary, the invention is based on the concept of transmitting to a road user a trained artificial intelligence comprising a predictive model for predicting a future signaling of the traffic infrastructure element. Furthermore, the road user receives traffic data by way of example in a non-discriminatory manner, by way of example detector data, with the result then that the road user may interpret this data themselves using the artificial intelligence or may themselves create a prediction regarding the future signaling of the traffic infrastructure element. Consequently, the road user may create a prediction that is by way of example dependent upon their current location, direction or intended driving behavior.

This means in other words, by way of example, that the trained artificial intelligence (software, the generation of which requires a high degree of traffic technical knowledge), is itself present in the motor vehicles. The motor vehicles interpret the information specifically for themselves with the result that accordingly applications that are executed in the motor vehicle itself may further process this information.

It is consequently rendered possible by way of example to sell the trained artificial intelligence individually per motor vehicle or by way of example for a motor vehicle fleet and by way of example to distribute the respective trained artificial intelligence via a web server for all light signal systems of a specific region.

The training of the artificial intelligence generally requires a high computing outlay and is therefore advantageously performed on a central infrastructure. The trained artificial intelligence is however, as far as the file size is concerned, relatively small and may therefore be transmitted rapidly and simply via a communications network to end devices that the road users comprise or rather are embodied with.

Although the invention has been further illustrated and described in detail by the preferred exemplary embodiments, the invention is not limited in this manner by the disclosed examples and other variations may be derived therefrom by the person skilled in the art without departing from the protective scope of the invention.

The invention claimed is:

1. A system for supporting a road user during a prediction of a future signaling of a traffic infrastructure element, the system comprising:
    a storage facility in which artificial intelligence is stored, the artificial intelligence containing a predictive model for predicting the future signaling of the traffic infrastructure element; and
    a communications facility for transmitting the artificial intelligence to the road user via a communications network.

2. The system according to claim 1, wherein:
    the predictive model is embodied so as to predict the future signaling of the traffic infrastructure element based upon traffic data;
    the computer system is embodied to receive traffic data;
    the computer system is embodied to train the artificial intelligence based upon the traffic data; and
    the computer system is embodied to transmit, via said communications facility, the traffic data to the road user via the communications network.

3. The system according to claim 1, wherein:
    the predictive model is embodied so as to predict the future signaling of the traffic infrastructure element based upon signaling data that describes a prevailing signaling of the traffic infrastructure element, and/or based upon switching time data that describes a prevailing switching time of the traffic infrastructure element; and
    the computer system is embodied to train the artificial intelligence based upon signaling data that describes a prevailing signaling of the traffic infrastructure element, and/or based upon switching time data that describes a prevailing switching time of the traffic infrastructure element.

4. The system according to claim 1, wherein:
    said communications facility is embodied so as not to transmit the artificial intelligence to the road user until at least one predetermined condition is met; and
    the at least one predetermined condition is respectively an element selected from the group of conditions consisting of: the road user is located within a predetermined distance with respect to the traffic infrastructure element, and a request is received, by means of said communications facility, from the road user to transmit the artificial intelligence.

5. The system according to claim 1, further comprising a computer system that is embodied so as to train an artificial intelligence template that is stored in said storage facility both based upon data that the traffic infrastructure element itself uses in order to determine the future signaling, as well as based upon signaling that is determined and signaled by means of the traffic infrastructure element itself, wherein said computer system is embodied so as to store a trained artificial intelligence template as the artificial intelligence in said storage facility.

6. The system according to claim 1, wherein the traffic infrastructure element is an element selected from the group of traffic infrastructure elements consisting of: a light signal system, a variable traffic sign, and a speed-limiting sign.

7. The system according to claim 1, wherein:
    a computer system is embodied to receive signaling data of the traffic infrastructure element and/or switching data of the traffic infrastructure element; and
    the computer system is embodied to transmit via said communications facility the signaling data of the traffic infrastructure element and/or the switching time data of the traffic infrastructure element to the road user via said communications network.

8. The system according to claim 1, wherein:
    a computer system is embodied so as to receive traffic data and signal image data that is displayed by the traffic infrastructure element; and
    the computer system is embodied so as to train the artificial intelligence using the traffic data and signal image data and the communications facility for transmitting the trained artificial intelligence to the road user via the communications network.

9. The system according to claim 8, wherein the computer system is in a control device of a light signal system and is located on an intersection at which the light signal system is arranged.

10. The system according to claim 1, with a computer system that is embodied so as to train the artificial intelligence that is stored in said storage facility based upon data that the traffic infrastructure element itself uses in order to determine the future signaling, as well as based upon signaling that is determined and signaled by the traffic infrastructure element itself, wherein said computer system is embodied so as to store a trained artificial intelligence template in said storage facility, and the communications facility for transmitting the trained artificial intelligence to the road user via the communications network.

11. A method for supporting a road user during a prediction of a future signaling of a traffic infrastructure element using artificial intelligence, wherein the artificial intelligence including a predictive model for predicting the future signaling of the traffic infrastructure element, which comprises:
    training the artificial intelligence based upon data that the traffic infrastructure element itself uses in order to determine the future signaling, as well as based upon signaling that is determined and signaled by means of the traffic infrastructure element itself; and transmitting the artificial intelligence to a road user via a communications network.

12. The method according to claim 11, wherein the predictive model is embodied so as to predict the future signaling of the traffic infrastructure element based upon traffic data, wherein the traffic data is transmitted to the road user via the communications network.

13. The method according to claim 11, wherein:

the predictive model is embodied so as to predict the future signaling of the traffic infrastructure element based upon signaling data that describes a prevailing signaling of the traffic infrastructure element, and/or based upon switching time data that describes a prevailing switching time of the traffic infrastructure element, wherein the signaling data and/or the switching time data is transmitted to the road user via the communications network; and the artificial intelligence is trained based upon signaling data that describes a prevailing signaling of the traffic infrastructure element, and/or based upon switching time data that describes a prevailing switching time of the traffic infrastructure element.

14. The method according to claim 11, wherein the artificial intelligence is not transmitted to the road user until at least one predetermined condition is met, which further comprises selecting the at least one predetermined condition from the group of conditions consisting of: a road user is located within a predetermined distance with respect to the traffic infrastructure element, and a request is received from the road user to transmit the artificial intelligence.

15. The method according to claim 11, which further comprises training an artificial intelligence based upon data that the traffic infrastructure element itself uses in order to determine the future signaling, as well as based upon signaling that is determined and signaled by means of the traffic infrastructure element itself, wherein a trained artificial intelligence template is used as the artificial intelligence.

16. The method according to claim 11, wherein the traffic infrastructure element is an element selected from the group of traffic infrastructure elements consisting of: a light signal system, a variable traffic sign, and a speed-limiting traffic sign.

17. The method according to claim 11, wherein the artificial intelligence is trained using the traffic data and signal image data that is displayed by the traffic infrastructure element.

18. A non-transitory computer readable medium having computer executable instructions which when executed on a computer perform a method for supporting a road user during a prediction of a future signaling of a traffic infrastructure element using an artificial intelligence, wherein the artificial intelligence contains a predictive model for predicting the future signaling of the traffic infrastructure element, which comprises the step of:

transmitting the artificial intelligence to the road user via a communications network.

* * * * *